United States Patent Office 3,240,782
Patented Mar. 15, 1966

3,240,782
METHOD OF CONVERTING 2-DEHYDRO-ISOEMETINE INTO 2-DEHYDRO-EMETINE AND INTERMEDIATES THEREIN
Arnold Brossi, Verona, N.J., and Max Gerecke, Basel, Switzerland, assignors to Hoffmann-La Roche Inc., Nutley, N.J., a corporation of New Jersey
No Drawing. Filed Feb. 8, 1963, Ser. No. 257,074
Claims priority, application Switzerland, Feb. 16, 1962, 1,885/62
16 Claims. (Cl. 260—286)

2-dehydro-emetine represents an outstanding chemotherapeutic agent for the treatment of amebiasis and bilharziasis. It is obtained according to known methods in the form of a stereoisomeric mixture which, besides 2-dehydroemetine (Formula I infra, wherein R is hydrogen), also contains 2-dehydro-isoemetine (Formula II infra, wherein R is hydrogen).

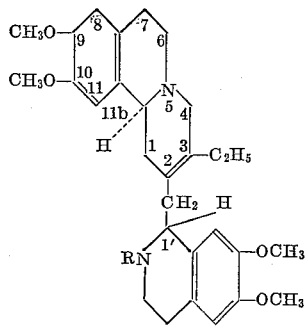

(I)

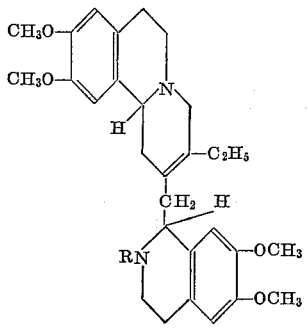

(II)

The compounds of the above formulas represent a class wherein R is selected from the group consisting of hydrogen, acyl and carbalkoxy.

If the compounds of the above formulas represent racemates, then only the relative configuration of the two asymmetric centers, 11b and 1', is shown. Likewise, if the above formulas represent optically active compounds, then they embrace also their antipodes.

These stereoisomers can easily be separated from one another. Chemotherapeutic test results have shown that only the 2-dehydro-emetine (I) possesses the desired activity, whereas the 2-dehydro-isoemetine (II) is inactive. In order to obtain an increased total yield of the active substance, it is therefore desirable to convert 2-dehydro-isoemetine (II) into 2-dehydroemetine (I). The object of the present invention is to provide such a conversion.

The present invention provides a method for the conversion of 2-dehydro-isoemetine (II) into 2-dehydroemetine (I) which comprises oxidizing 2-dehydro-isoemetine with a mercuric salt and subsequently reducing the so-obtained oxidation product.

It is known that emetine via treatment with mercuric acetate in acetic acid solution is converted into an oxidation product which is called rubremetine; and which possesses the formula:

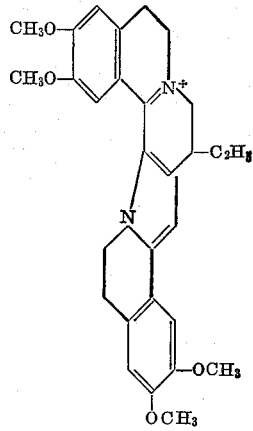

(III)

As is evident, this compound possesses a complicated hexacyclic structure and, moreover, by any known method cannot be reconverted into emetine. It was to be expected therefore that the corresponding oxidation in the dehydro-emetine series would proceed to a similar oxidation product, no longer subject to reconversion into dehydro-emetine. Surprisingly, this is not the case. Rather, by the process of this invention 2-dehydro-isoemetine yields an oxidation product (Formula IV infra) which can easily be reduced to the desired dehydroemetine substance.

The treatment of a compound of Formula II with a mercuric salt according to the process of this invention destroys the asymmetric center at the 11b-carbon atom via dehydrogenation whereby there is obtained an oxidation product, more particularly, the tridehydro-emetine which contains a cation of the following formula:

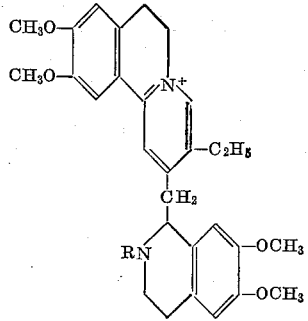

(IV)

wherein R is selected from the group consisting of hydrogen, acyl and carbalkoxy.

The anion of the tridehydro emetine of Formula IV can be an anionic moiety of an organic or inorganic acid. Such anions are, for example, the anion of inorganic acids such as hydrohalic acids, perchloric acid or the like, or of organic acids, such as acetic acid, oxalic acid or the like. Preferably the anion should be that of an acid which does not degrade the cationic structure. Especially preferred is the chloride anion.

As used herein the term acyl refers especially to the carbonyl moieties of carboxylic acids, for example, alkanoyl radicals such as lower alkanoyl and aroyl radicals such as benzoyl. Also the term carbalkoxy comprehends moieties such as carb-lower alkoxy radicals, for example, carb-ethoxy.

By reduction of the tridehydro-emetine of Formula IV there is obtained a mixture of a 2-dehydro-emetine (I) and a 2-dehydro-isoemetine (II). For the purpose of isolating the 2-dehydro-emetine from the mixture of 2- dehydro-emetine (I) an 2-dehydro-isoemetine (II), the stereoisomeric mixture can be separated, which can be effected, for example, by a fractional crystallization of the bases or of their salts with organic or inorganic acids.

Besides 2-dehydro-isoemetine, N-acyl or N-carbalkoxy derivatives thereof (i.e. compounds of Formula II wherein R is acyl and carbalkoxy) can also be subjected to the oxidation and subsequent reduction process of this invention. Such N-substituted compounds can easily be prepared from 2-dehydro-isoemetine via reaction with a suitable acylating agent. N-lower-alkonoyl derivatives are, for example, obtained by reaction of 2-dehydro-isoemetine with a lower alkanoyl halide or anhydride. Illustratively, N-acetyl-2-dehydro-isoemetine can be prepared by reaction of 2-dehydro isoemetine with acetic anhydride. Other suitable acyl moieties are represented by aroyl groups, for example, benzoyl, N-carb-lower alkoxy-2-dehydro-isoemetine can be prepared by reaction of 2-dehydro-isoemetine with a lower alkyl haloformate, such as, for example, ethylchloroformate. In another embodiment 2-dehydro-isoemetine can first be oxidized by the method of this invention. The so-obtained oxidation product can then be N-acylated or N-carbalkoxylated and the so-obtained compounds thereafter reduced by the methods described below. There is thus obtained in either case (i.e. by acylating or carbalkoxylating before or after oxidation), N-acyl or N-carbalkoxy-2-dehydro-emetine.

After execution of the oxidation and reduction sequence, the N-substituent is suitably removed, which can be effected, for example, via acid hydrolysis. Thus, the N-acetyl-2-dehydro-emetine obtained by the above described processes can be converted into 2-dehydro-emetine, for example, by boiling in dilute hydrochloric acid. In the case where the process proceeds through an N-benzoyl derivative, the benzoyl moiety can be converted into a benzyl moiety during the reduction step conducted according to the method of the present invention. This occurs, for example, when the reduction is conducted with a reducing agent such as lithium aluminium hydride. The benzyl moiety can subsequently be removed via hydrogenolysis in the presence of a selective hydrogenation catalyst, for example, palladium/carbon in acetic acid solution.

The anion of the mercuric salt used can be either inorganic or organic. Moreover, it can be the anion of a strong acid or the anion of a weak acid. Preferably the mercuric salt used should be one which is soluble in the reaction medium.

A mercuric salt, especially useful as the oxidizing agent in the first step of the method of this invention is, for example, mercuric acetate. Mercuric salts of other acids such as, for example, mercuric nitrate, as well as the complex compounds of mercuric salts with ethylene diamine tetraacetic acid are also suitable. The employment of mercuric acetate in dilute acid, for example, aqueous acetic acid, is especially advantageous. The reaction takes place at elevated temperatures, preferably at between about 30° C. and about 60° C. The mercurous acetate, for example, which precipitates after the oxidation can be separated and easily regenerated into mercuric acetate. It is suitable to remove the mercury salt residues found in the solution before the reduction, which removal can suitably be effected by introduction of hydrogen sulfide into the acid solution.

The oxidation product of 2-dehydro-isoemetine (Formula IV supra) as well as its N-acyl or N-carbalkoxy derivatives, are advantageously isolated after the oxidation as salts of strong organic or inorganic acids. As such there can be used common strong inorganic acids such as, for example, hydrochloric acid, hydrobromic acid, perchloric acid or the like, or common strong organic acids such as oxalic acid or the like. Preferably the acid used should be one which does not degrade the cationic tridehydro-emetine structure. Especially preferred is hydrochloric acid.

Tridehydro-emetines of Formula IV supra have been found to decompose upon warming in acid or alkali solution. It is therefore important to exercise close control during the work up of the oxidation product to make sure that the tridehydroemetine is not heated for an unnecessary length of time. Suitably, temperatures over 60° C. should be avoided.

The oxidation products of Formula IV supra can be subjected to the reduction method of this invention. Suitable reducing agents are, for example, earth alkali metal hydrides, alkali metal metal hydrides (expediently in a suitable solvent) such as, for example, calcium hydride, alkali metal borohydrides or alkali metal aluminum hydrides, especially sodium borohydride. The choice of a suitable solvent medium depends upon the solubility of the reducing agent, of the substance being reduced as well as of the reduction product. Suitable solvents are for example, water or organic solvents, such as dioxane, tetrahydrofuran, dimethylformamide and lower alkanols, for example, methanol, ethanol, or the like. Often it is advantageous to employ an organic solvent in an aqueous medium. Conducting the reduction in aqueous methanol is especially suitable. The reduction can also be effected in a hydrogen atmosphere in the presence of a hydrogenation catalyst, for example, platinum oxide, platinum, palladium, Raney nickel, or the like, suitably in an alcoholic solution, and at a low temperature. As a rule, an N-substituent, if present, must be removed via subsequent hydrolysis if it is desired that the nitrogen atom of the isoquinoline ring be unsubstituted in the end product.

The bases obtained after the reduction are in the form of isomeric mixtures of 2-dehydro-emetine and 2-dehydro-isoemetine (or their N-acyl or N-carbalkoxy derivatives), which can be separated according to known methods, for example, via fractional crystallization, advantageously by way of their salts (the oxalates are especially suitable for this purpose), into 2-dehydro-emetine and 2-dehydro-isoemetine (or their N-acyl or N-carbalkoxy derivatives). The 2-dehydro-isoemetine so-obtained can then be converted into 2-dehydro-emetine by being submitted anew to the method of this invention.

Racemic as well as optically active starting materials can be employed in the method of this invention. When a racemic starting material is employed the racemate obtained following the oxidation and reduction can, if desired, be separated into its enantiomers.

The following examples are illustrative but not limitative of the invention. All temperatures are stated in degrees centigrade.

*Example 1*

80 g. of rac. 2-dehydro-isoemetine was dissolved in 3.2 liters of 10% aqueous acetic acid, mixed with 250 g. of mercuric acetate, and the resulting mixture maintained at 40° for 15 hours. The resultant mercurous acetate was filtered off, the excess mercuric salt removed as sulfide, and the filtered solution concentrated at 40° (bath temperature) in vacuo. The residual product was converted to its hydrochloride with methanolic hydrochloric acid and this was crystallized at room temperature from methanol/ether. 80 g. of tridehydro-emetine chloride hydrochloride of melting point 176–178° was thus obtained. Treatment of the methanolic solution of the hydrochloride with 60% aqueous perchloric acid yielded tridehydro-emetine diperchlorate melting at 162–163°, U.V.—Maxima of the hydrochloride in alcohol at 232 (shoulder), 285 m$\mu$ and 365 m$\mu$, $\epsilon$=23,200, 18,300 and 15,800.

A solution of 4.4 g. of sodium borohydride in 25 ml. of water was added, in the course of 15 minutes, with cooling to 20–25°, to a solution of 15 g. of tridehydro-emetine-chloride hydrochloride in 150 ml. of methanol. The so-formed mixture was stirred for 2 hours, the methanol removed in vacuo, the residue extracted with chloroform, the chloroform solution concentrated to dryness and the so-obtained residue dissolved in 50 ml. of methanol of 4.9 g. of anhydrous oxalic acid added thereto. Upon standing overnight at 5°, 7.75 g. of rac. 2-dehydro-isoemetine acid oxalate melting at 176–178° crystallized out. (This substance was in all ways identical with an authentic specimen. It can anew be subjected to the oxidation and reduction stages of this invention.) After the removal by filtration of the crude oxalate of rac. 2-dehydro-isoemetine, the filtrate was concentrated in vacuo. The residue was then partitioned between aqueous sodium hydroxide and chloroform. The chloroform solution was concentrated and the residue consisted of 7.6 g. of crude 2-dehydo-emetine base. This was dissolved in 50 ml. of 80% methanol and 8 N methanolic hydrochloric acid was added thereto in slight excess. Ether was added to the resulting solution until turbidity commenced and the dispersion then permitted to stand overnight at 5°. As a result there was obtained 5.6 g. of 2-dehydro-emetine dihydrochloride in the form of a hydrate melting at 245–247° (dec.), which in all respects was identical with an authentic sample. The filtrate contained a mixture of the hydrochloride of 2-dehydro-isoemetine and 2-dehydro-emetine. By repetition of the above described separation method there was obtained a further 2.05 g. of 2-dehydro-isoemetine oxalate and 0.4 g. of 2-dehydro-emetine dihydrochloride.

*Example 2*

2.6 g. of rec. N-acetyl-2-dehydro-isoemetine (melting at 153–154°) was dissolved in 150 ml. of 10% aqueous acetic acid. To this solution there was added 6.4 g. of mercuric acetate, and the mixture stirred for 12 hours at 40° in a nitrogen atmosphere. After working up the reaction mixture according to the method described in Example 1, there was obtained N-acetyl-tridehydro-emetine perchlorate which, upon recrystallization from methanol/ether melted at 233–234° and exhibited U.V.—Maxima at 232 mμ (shoulder), 268 mμ (shoulder), 282 mμ and 367 mμ.

N-acetyl-tridehydro-emetine perchlorate can also be prepared by the following method: 3 g. of tridehydro-emetine-chloride hydrochloride in 20 ml. of pyridine and 12 ml. of acetic anhydride was permitted to stand for 20 hours at room temperature. The reaction mixture was then concentrated in vacuo and the residue dissolved in dilute hydrochloric acid. This was then extracted with chloroform. The residue obtained upon concentration of the chloroform solution consisted of crude N-acetyl-tridehydro-emetine-chloride. This crude product was dissolved in methanol, and by the addition of perchloric acid, converted into its perchlorate. There was thus obtained 2.85 g. of N-acetyl-tridehydro-emetine perchlorate, which was identical with the product obtained by the procedure described immediately above.

A solution of 0.5 g. of rac. N-acetyl-tridehydro-emetine perchlorate in 5 ml. of dimethylformamide was added in the course of 20 minutes to of solution of 0.5 g. of sodium borohydride in 2.5 ml. of water. Towards the end of the reaction, additional 0.2 g. of sodium borohydride was added. The reaction mixture was stirred for a further 1½ hours, then treated with dilute sodium hydroxide and extracted with chloroform. The residue from the chloroform extract was fractionally crystallized from methanol. There was thus obtained 0.15 g. of rac. N-acetyl-2-dehydro-emetine melting at 188°, then 0.1 g. of rac. N-acetyl-2-dehydro-isoemetine melting at 150°, both identical with authentic materials.

Rec. 2-dehydro-emetine was obtained from rac. N-acetyl-2-dehydro-emetine via hydrolysis effected, for example, by treating the N-acetyl compound for 4 hours at reflux with 20% aqueous hydrochloric acid. Via the conventional working up procedure and crystallization via the oxalate there was obtained rac. 2-dehydro-emetine. The saponification of the N-acetyl group was also effected prior to the separation of the rac. N-acetyl-2-dehydroemetine and rac. N-acetyl-2-dehydro-isoemetine containing mixture.

*Example 3*

3.64 g. of disodium-ethylenediamine-N,N,N',N'-tetraacetic acid and 3.08 g. of mercuric acetate were added to a solution of 2.39 g. of 2-dehydro-isoemetine in 50 ml. of 10% acetic acid. The resulting mixture was then warmed for 2½ hours at 40° and concentrated in vacuo at a water bath temperature of 40°. The residue was then taken up in ethanol and treated with alcoholic hydrochloric acid. The insoluble mercury salts were removed by filtration and the filtrate treated with ether, whereupon 1.25 g. of tridehydro-emetine-chloride hydrochloride crystallized out.

*Example 4*

8.57 g. of mercuric nitrate was added to a solution of 2.39 g. of 2-dehydro-isoemetine in 100 ml. of water and 1.05 ml. of 65% nitric acid. The resulting mixture was warmed for 20 hours at 40° and yielded tridehydro-emetine-nitrate.

*Example 5*

0.5 g. of (−)-2-dehydro-isoemetine dihydrobromide was dissolved in water. The soluution was rendered alkaline with sodium hydroxide and then extracted with chloroform. The chloroform was evaporated and the (−)-2-dehydro-isoemetine so-obtained dissolved in 25 ml. of 10% acetic acid and heated with 1.6 g. of mercuric acetate for 15 hours at 40°. After working up in the method described in Example 1 the reaction product was dissolved in 15 ml. of methanol and treated with 60% perchloric acid. 0.45 g. of (+)-tridehydro-emetine diperchlorate crystallized out and upon recrystallization from acetone/ether melted at 170–171°; $[\alpha]_D^{25°} = +48°$ (0.1% in methanol).

We claim:
1. A method for the preparation of a compound of the formula

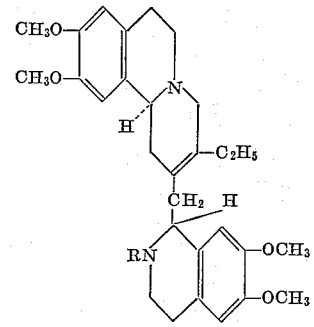

wherein R is selected from the group consisting of hydrogen, lower alkanoyl, benzoyl, benzyl and carb-lower alkoxy which comprises treating a compound selected from the group consisting of compounds of the formula

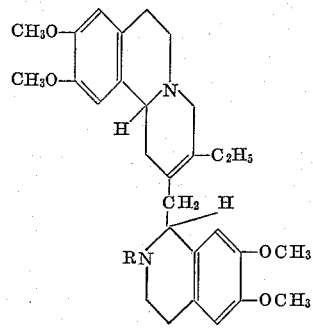

wherein R is selected from the group consisting of hydrogen, lower alkanoyl, benzoyl and carb-lower alkoxy, and optically active isomers thereof, with a mercuric salt and reducing the so-obtained oxidation product.

2. A method for the preparation of a compound of the formula

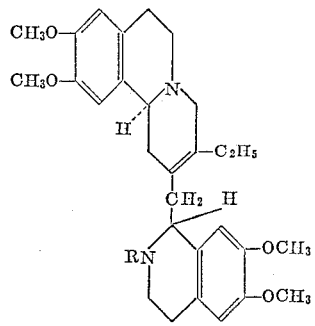

wherein R is selected from the group consisting of hydrogen, lower alkanoyl, benzoyl, benzyl and carb-lower alkoxy which comprises treating 2-dehydro-isoemetine with a mercuric salt; converting the so-formed oxidation product into a derivative selected from the group consisting of N-lower alkanoyl, N-benzoyl and N-carb-lower alkoxy derivatives; and reducing the so-formed compound.

3. A method for the preparation of 2-(2'-acetyl-6',7'-dimethoxy-1',2',3',4' - tetrahydro-1'-isoquinolyl-methyl)-3 - ethyl-9,10-dimethoxy-1,6,7,11b-tetrahydro-4H-benzo[a]quinolizine which comprises oxidizing N-acetyl-2-dehydro-isoemetine with mercuric acetate in acetic acid solution, thereby forming the 2 - (2'-acetyl-6',7'-dimethoxy-1',2',3',4'-tetrahydro - 1' - isoquinolyl-methyl)-3-ethyl-9,10-dimethoxy-6,7-dihydro-benzo[a]quinolizinum cation, and subsequently reducing said so-formed compound.

4. A method which comprises oxidizing a compound selected from the group consisting of a compound of the formula

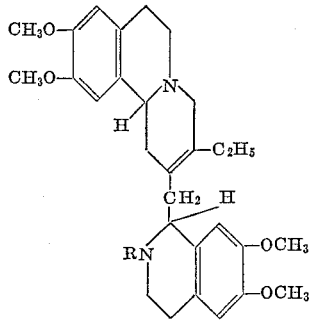

wherein R is selected from the group consisting of hydrogen, lower alkanoyl, benzoyl and carb-lower alkoxy, and optically active isomers thereof, with a mercuric salt, thereby producing a compound containing a cation of the formula

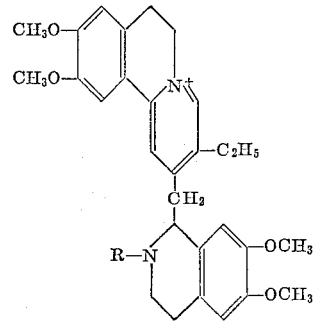

wherein R has the same meaning as above.

5. A process as in claim 4 wherein the oxidation is effected by the use of mercuric acetate.

6. A process for the preparation of a compound selected from the group consisting of 2-dehydro-emetine, N-lower alkanoyl - 2 - dehydro-emetine, N-benzoyl-2-dehydro-emetine, N-carb-lower alkoxy-2-dehydro-emetine, and optically active isomers thereof, which comprises reducing a compound containing a cation of the formula

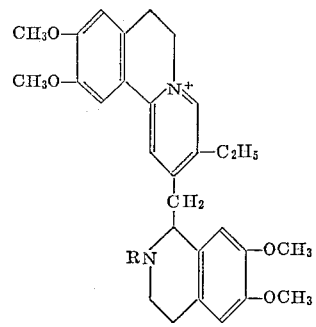

wherein R is selected from the group of hydrogen, lower alkanoyl, benzoyl and carb-lower alkoxy.

7. A process as in claim 6 wherein the reduction is effected by treatment with an agent selected from the group consisting of alkaline earth metal hydrides and alkali metal metal hydrides.

8. A process as in claim 6 wherein the reducing agent is sodium borohydride.

9. A compound consisting of an anion and a cation of the formula

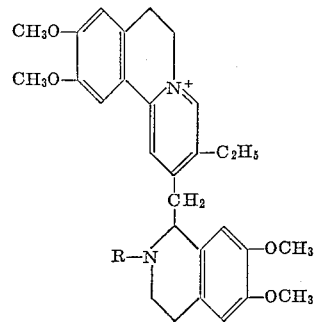

wherein R is selected from the group consisting og hydrogen, lower alkanoyl, benzoyl and carb-lower alkoxy; and the anion of an acid which does not degrade said cationic structure.

10. A compound consisting of the 2-(6',7'-dimethoxy-1',2',3',4'-tetrahydro - 1' - isoquinolyl-methyl)-3-ethyl-9,10-dimethoxy - 6,7 - dihydro-benzo[a]quinoliziniumcation and an anion.

11. 2-(6',7'-dimethoxy - 1',2',3',4' - tetrahydro-1'-isoquinolyl-methyl)-3-ethyl - 9,10 - dimethoxy-6,7-dihydrobenzo[a]quinolizinum-chloride hydrochloride.

12. 2-(6',7'-dimethoxy - 1',2',3',4' - tetrahydro-1'-isoquinolyl-methyl)-3-ethyl - 9,10 - dimethoxy-6,7-dihydrobenzo[a]quinolizinum-perchlorate hydroperchlorate.

13. A compound consisting of the 2-(2'-acetyl-6',7'-dimethoxy-1',2',3',4'-tetrahydro - 1' - isoquinolyl-methyl)-3 - ethyl-9,10-dimethoxy-6,7-dihydro-benzo[a]quinolizinium cation and an anion.

14. 2-(2'-acetyl-6',7'-dimethoxy - 1',2',3',4' - tetrahydro-1'-isoquinolyl-methyl)-3-ethyl - 9,10 - dimethoxy-6,7-dihydro-benzo[a]quinolizinium-perchlorate.

15. A method for the preparation of 2-(6',7'-dimethoxy-1',2',3',4'-tetrahydro - 1' - isoquinolyl-methyl)-3-ethyl-9,10-dimethoxy - 1,6,7,11b - tetrahydro-4H-benzo[a]quinolizine which comprises oxidizing 2-dehydro-isoemetine with mercuric acetate in acetic acid solution, thereby forming the 2-(6',7'-dimethoxy-1',2',3',4'-tetrahydro-1'- isoquinolyl-methyl) - 3 - ethyl - 9,10 - dimethoxy-6,7-dihydro-benzo[a]quinolizinium cation, and subsequently reducing said so-formed compound.

16. A method according to claim 15 wherein the reduction is effected by using sodium borohydride in aqueous methanol.

References Cited by the Examiner

Barash et al., Chem. & Ind., pages 490–1 (1958).

HENRY R. JILES, *Acting Primary Examiner.*

DON M. KERR, D. G. DAUS, *Assistant Examiners.*